Patented Aug. 26, 1930

1,774,013

UNITED STATES PATENT OFFICE

CHARLES W. HOWE, OF FAIRHAVEN, MASSACHUSETTS

SEALING PASTE OR COMPOUND

No Drawing.   Application filed June 4, 1929.   Serial No. 368,445.

This invention relates to improvements in sealing pastes or compounds for sealing pipe joints, boiler connections and the points of union between other connected fittings or parts.

The principal object of the invention is to provide a paste or compound which may be employed with greater efficiency for sealing joints and connections against leakage or loss of pressure.

A further object of the invention is to provide a sealing paste or compound which lubricates the joint or connection to prevent corrosion or oxidation, and which is immune from deterioration under the action of heat, cold, acid, oil and other destructive agents.

The present improved sealing paste or compound consists of a mixture of but two substances, namely, mica which is used as the lubricating or sealing element, and a suitable carrier vehicle or adhesive such as glucose. The mica is comminuted or pulverized to form minute flaked particles and preferably is purified to remove any foreign matter. The lubricating characteristics of mica are well known and its enduring qualities have been found to be greater than those of any substance heretofore used for sealing purposes, for mica is practically indestructible.

As above explained, a binder or vehicle such as glucose is used to carry or support the mica flakes, and other tenacious substances such as molasses may be used for the same purpose. The purpose of the adhesive component is twofold: first, it acts to hold the mica flakes in suspended or spaced relation until acted upon by heat; and secondly, it adapts the mixture to be readily spread on or otherwise applied to the members of the joint. At the same time it guides the particles of mica into the interstices or crevices which often appear on the contacting surfaces of the joints or other connections.

In preparing the compound I prefer to mix the ingredients in approximately the following proportions, viz., one part of finely flaked mica to four parts of adhesive such as glucose. I preferably use glucose as a vehicle because it does not readily ferment when exposed to the atmosphere and it retains its tenacious qualities over long periods of time. The ingredients may be thoroughly mixed together without the application of heat, and the paste or cement thus formed is applied to the joints or connections in the manner as next explained.

The parts to be joined are coated or smeared with the paste in the usual way. The joint members may then be screwed, bolted or otherwise secured together and the paste will be forced into the crevices and interstices of the contacting surfaces. Heat is then applied to the outside of the joint or connection to cause vaporization of the water in the compound which is followed by a rapid carbonizing of the glucose. During these processes the flakes of mica are deposited one upon another in overlapping relation to form a solidified coating resembling an applied gasket within the joint. A joint thus sealed with the improved compound is maintained fluid tight almost indefinitely, being proof against leakage under high pressure and also protected from rust and corrosion. When it is desired to disconnect the pipe fittings or other joined parts they are given a sharp twist with a wrench or other tool. This will disintegrate or break the layer of mica to permit ready separation of the parts of the joint due to the lubricating qualities of the mica.

It will be observed from the foregoing that the present improved sealing paste or cement provides greater efficiency and security in sealing various types of joints and connections. Heretofore the fillers used in similar pastes and compounds have been formed of small irregularly shaped particles or crystals which do not overlap or pack closely so that minute interstices remain through which the liquid or other fluid may escape.

The present improved compound is lighter in weight and more durable in use than similar compounds heretofore employed for like purposes and, in addition, it renders the joint to which it is applied impervious to moisture, heat, cold, oil and acid, besides adapting it to withstand high pressure. It may therefore be used with greater security on boiler connections and other equipment ordinarily subjected to high temperatures. It may also be used with success on refrigeration apparatus pipe lines as it will not corrode or be otherwise injured by the fluid contained therein.

While the insolubility and indestructibility of mica are well known as adapting it for various purposes, I believe that it has never heretofore been used as a component of sealing pastes of the particular nature herein described. Regardless of the successive comminution or breaking up of the mica into fine particles, these will always remain in flaked form. It is this property of mica, therefore, that causes the particles to be deposited upon each other in overlapping relation like scales to form a solid impervious and impenetrable mass or coating. Due to the lubricating qualities of mica, the surfaces to which it is applied are protected against rust and corrosion, and the joined members may therefore be readily disconnected when required. The improved compound is adapted for use not only on metallic joints and connections, but may be employed with equal effect to seal connected members constructed from glass, porcelain and similar materials.

While I have herein described the improved sealing paste as having the mica compounded in certain proportion with a preferred binder, it is to be understood that other ingredients may be used as a vehicle for the mica which supplies the filler and lubricating element without departing from the spirit or scope of the invention.

Therefore, without limiting myself to the exact embodiment of the invention as herein described, I claim:

1. A sealing paste of the character described comprising comminuted mica and glucose.

2. A sealing compound for the purposes specified comprising approximately 80% of glucose and 20% of flaked mica.

3. A sealing compound for the purposes specified comprising flaked mica mixed with a nonfermentitious glutinous vehicle.

In testimony whereof I hereunto affix my signature.

CHARLES W. HOWE.